United States Patent Office 3,400,084
Patented Sept. 3, 1968

3,400,084
CATALYST COMPOSITION FOR POLYMERIZING ALPHA-OLEFINS
Osamu Fukumoto and Yuji Atarashi, Ohtsu-shi, Japan, assignors to Toyo Rayon Kabushiki Kaisha, Tokyo, Japan, a corporation of Japan
No Drawing. Filed Apr. 2, 1964, Ser. No. 356,952
Claims priority, application Japan, Apr. 8, 1963, 38/17,392
2 Claims. (Cl. 252—429)

This invention relates to a catalyst composition for polymerizing alpha-olefins. More particularly, it relates to a catalyst composition for polymerizing alpha-olefins which comprises at least the three requisite components of:

(1) an aluminum sesquihalide,
(2) a halide of a transition metal of Groups IVa–VIa of the Periodic Table, and
(3) an alkali metal salt of an inorganic oxyacid.

Numerous compositions have been proposed in the past as catalysts for polymerizing alpha-olefins such as ethylene, propylene, butene-1, etc. As a typical one, there is the catalyst composition consisting of a titanium halide, such as titanium trichloride or titanium tetrachloride, and an organoaluminum compound, such as triethylaluminum or diethylaluminum chloride. It is known that when alpha-olefins are polymerized using this catalyst composition a crystalline polymer is obtained. This catalyst composition has the drawback, however, that the organic aluminum compound such as triethylaluminum or diethylaluminum chloride which is used as one of its components is a compound that is difficult to manufacture and is relatively expensive.

It is an object of the present invention to provide a catalyst for polymerizing alpha-olefins having a performance comparable to that of the aforementioned known catalyst composition, which is obtained by using compounds whose manufacture is far simpler than triethylaluminum or diethylaluminum chloride and which are available at lower costs.

All other objects of this invention will in part be obvious and will in part appear hereinafter.

The sesquihalides of aluminum can be made, for example, from halogenated hydrocarbons and metallic aluminum and, as compared with the trialkylaluminum or dialkylaluminum halides, their manufacture is simple, there being no necessity for complicated steps. Hence, it is obvious that it would be commercially to great advantage if the aluminum sesquihalides could be used as a component of the catalyst for polymerizing alpha-olefins instead of the trialkylaluminum or dialkylaluminum halides. According to our experiments, however, we could not obtain solid polypropylene suitable for use as materials for making fibers, films and other shaped structures even though alpha-olefins, for example, propylene, were polymerized using a catalyst comprising a titanium halide and an aluminum sesquihalide after the aforementioned conventional catalyst composition. However, we have discovered that, as hereinbefore stated, the composition comprising at least the three components of (1) an aluminum sesquihalide, (2) a halide of a transition metal of Groups IVa–VIa of the Periodic Table and (3) an alkali metal salt of an inorganic oxyacid was very desirable for attaining the above mentioned objects of the present invention.

The three components of the catalyst composition of the invention are indispensable. In the case of a 2-component system comprising the first and second components, while a polymerization reaction may occur slightly on some occasions, its performance is considerably inferior to that of a 3-component system containing the third component. And it is particularly impossible by the use of the 2-component system to obtain from propylene and the alpha-olefins higher than propylene highly crystalline polymers that are useful as materials for making the various kinds of shaped structures.

The first component used in the catalyst composition of this invention, i.e., the aluminum sesquihalide, is represented by the general formula $R_3Al_2X_3$, where R is a hydrocarbon radical having 1–15 carbon atoms and X is a halogen, particularly a halogen selected from the group consisting of chlorine, bromine and iodine. A few specific examples thereof include methylaluminum sesquiiodide, ethylaluminum sesquichloride, ethylaluminum sesquibromide, ethylaluminum sesquiiodide, isopropylaluminum sesquichloride, n-propylaluminum sesquibromide, n-butylaluminum sesquichloride, benzylaluminum sesquichloride and phenylaluminum sesquibromide.

As the second component, i.e., the halide of a metal of Groups IVa–VIa of the Periodic Table, the halides of titanium, zirconium, vanadium, chromium and molybdenum are particularly suitable. Typical examples include such as titanium dichloride, titanium trichloride, titanium tetrachloride, zirconium tetrachloride, vanadium tetrachloride, vanadium trichloride, vanadyl trichloride, vanadyl dichloride, chromium trichloride and molybdenum pentachloride. The use is not restricted to the chlorides such as mentioned above but includes, needless to say, the corresponding bromides and iodides. Of these halides of a transition metal, the one that is especially suitable for polymerizing propylene and the alpha-olefins higher than propylene is titanium trichloride. Titanium trichloride can be made by such processes as reducing titanium tetrachloride using a reducing agent such as hydrogen, metallic aluminum, zinc, antimony, copper or other metals; reacting titanium tetrachloride with an alkylaluminum compound; or pyrolyzing an alkyltitanium trichloride. Titanium trichloride made by any of the foregoing processes may be used in the catalyst composition according to this invention. Further, the activity of these titanium trichlorides can be enhanced particularly when used after comminuted mechanically or heated in vacuum to above 400° C., particularly in the absence of moisture and oxygen.

The third component of the catalyst is an alkali metal salt of an inorganic oxyacid. As examples of the inorganic oxyacids, the following can be named: namely, nitric acid and nitrous acid; oxyacids of sulfur such as sulfuric, sulfurous, hyposulfurous, and thiosulfuric acids; oxyacids of boron such as boric, metaboric, perboric, tetraboric and pentaboric acids; oxyacids of phosphorus such as phosphoric, phosphorous, metaphosphoric, pyrophosphoric and hypophosphorous acids; oxyacids of silicon such as silicic and metasilicic acids; oxyacids of chlorine such as chloric, hypochloric, chlorous and perchloric acids and the corresponding bromic and iodic acids; oxyacids of arsenic such as arsenic, pyroarsenic, metaarsenic and arsenious acids; antimonic acids such as antimonic and metaantimonic acids; oxyacids of chromium such as chromic and bichromic acids; oxyacids of manganese such as manganic and permanganic acids; oxyacids of selenium such as selenic and selenious acids; and besides these, carbolic acid, cyanic acid, tungstinic acid, molybdenic acid, metavanadic acid, metastannic acid, aluminic acid and titanic acid. On the other hand, as the alkali metals can be mentioned lithium, sodium, potassium, rubidium and cesium. Hence the metal salts comprising a combination of these inorganic oxyacids and alkali metals include a great number of materials, but they can all be used as the third component in the catalyst composition of this invention. The metal salt used as the third component need not be limited to he neutral salts but may also be acid salts. Further, it is normally preferred that these metal salts be used in a state in which they do not contain water of crystallization. Hence, while there may be occasions when good results are obtained by using them after drying or pulverizing, these conditions are not indispensable in this invention.

The composition of these three components is preferably in a ratio of 1 mol of the aluminum sesquihalide (as $R_3Al_2X_3$) to 0.1–4 mols of the transition metal halide to 0.05–4 mols of the alkali metal salt of an oxyacid. However, the composition is variable over a still wider range, and hence the scope of the invention is not to be restricted to the aforementioned molar ratio.

Further, it is possible to carry out the polymerization reaction without using a solvent, namely, by bringing the catalyst composition of the invention into contact with an alpha-olefin monomer in the vapor phase. In addition, the polymerization reaction can be carried out by introducing the catalyst composition into an alpha-olefin in its liquid state without using a solvent. It is however most common and convenient to carry out the polymerization reaction using an inert solvent. Suitable as the inert solvents are the nonpolymerizable hydrocarbons and the chlorinated hydrocarbons. Typical, for example, are the saturated aliphatic hydrocarbons such as pentane, hexane, heptane, octane and decane; the alicyclic hydrocarbons such as cyclohexane, methylclohexane and decahydronaphthalene; the aromatic hydrocarbons such as benzene, toluene, xylene, ethylbenzene and tetrahydronaphthalene; and the aromatic chlorinated hydrocarbons such as chlorobenzene, o-dichlorobenzene and alpha-chloronaphthalene. Also suitably used are the hydrocarbon mixtures such as white kerosene, petroleum benzine, ligroin and petroleum ether. In all cases, it is preferred that the dehydrated and purified products of these solvents are used.

The catalyst composition of the invention can be used in either the continuous or batch-wise process of polymerization. When being used in the continuous process of polymerization, it is preferred for ensuring the uniformity of the properties of the polymer obtained that the catalyst composition be present in the polymerization apparatus with the maintenance of its composition constant. For example, this can be accomplished by continuously introducing into the polymerization apparatus the catalyst components mixed in a solvent to the prescribed molar ratio. Again, the catalyst composition can also be treated by heating to 60–150° C. prior to its use.

The polymerization reaction is usually carried out at a temperature of 0–200° C., the range 50–150° C. being particularly suitable. While the polymerization pressure will depend on the class of monomer to be polymerized, there is no particular restriction. Although the polymerization of propylene can be effected at below atmospheric pressure as the activity of the invention catalyst system is great, it is also to an advantage commercially to carry out the polymerization under superatmospheric pressures of the order of several kg./cm.$^2$ for obtaining an economical polymerization velocity. And while it is possible to carry out the polymerization at high pressures of 100 kg./cm.$^2$, or more, generally such a high pressure is not required.

The alpha-olefins which can be polymerized by using the invention catalyst are those having 2–12 carbon atoms. Included are not only the straight-chain alpha-olefins such as ethylene, propylene, butene-1, pentene-1 and decene-1, but also the branched alpha-olefins such as 3-methyl-butene-1, 4-methylpentene-1 and 4-methylhexene-1, or allylbenzene, styrene, o-methylstyrene and the other nucleus-substituted styrenes, and the alpha-olefins having a cyclic hydrocarbon radical, such as vinyl cyclohexane. Not only is it possible by means of the catalyst composition of the invention to effect the homopolymerization of these alpha-olefins by using them individually, but it is also possible to effect their copolymerization by using them mixed as well as to copolymerize them with other olefins besides alpha-olefins, such as butadiene, vinyl cyclohexene, isoprene and cyclohexadiene.

In polymerizing alpha-olefins by using the invention catalyst composition, the polymerization procedures used with the conventional catalysts can all be essentially adopted. For instance, the average molecular weight of the resulting polymer can be regulated by effecting the presence of hydrogen in the system during the polymerization reaction. A small amount of hydrogen frequently enhances the polymerization velocity. In addition, it is also possible to include in the polymerization system as a molecular weight controller, the halides or alkyl compounds of zinc, cadmium or mercury, and halogenated hydrogen or alkyl halides.

Also, in the case of the post treatmnet of the reaction product, the method of treatment, for example, of the process for polymerizing olefins wherein is used the conventional organometallic catalyst can be applied, except that in the case of the present invention, washing is conveniently carried out using an aqueous washing liquid at a suitable stage of the post treatment so as to effect the complete elimination of the third component.

The present invention is further illustrated by the following nonlimitative examples. Example 1, however, is an instance of the use of a catalyst composition other than that of the present invention, it being given by way of comparison.

EXAMPLE 1

A 200-cc. magnetic stirrer-equipped autoclave was charged with 60 cc. of purified n-heptane, 5 mmol (as $TiCl_3$) of titanium trichloride (that obtained by reducing titanium tetrachloride with metallic aluminum, which was then comminuted) and 5 mmol of ethylaluminum sesquichloride [$(C_2H_5)_3Al_2Cl_3$], all being charged under a dried nitrogen atmosphere.

The autoclave was then closed, followed by the complete substitution of the interior space with propylene, after which propylene was introduced up to a pressure of 2 kg./cm.$^2$ gauge. The autoclave was heated by means of an electric furnace, with stirring, to raise it to 80° C. in 20 minutes. The propylene pressure inside the autoclave was raised to 5 kg./cm.$^2$, after which the polymerization reaction was carried out for 5 hours while maintaining the pressure and temperature constant.

After completion of the polymerization, the autoclave was opened and an isopropanol-methanol mixture (50:50) was added, but the formation of solid polymers could not be observed.

EXAMPLES 2–21

The polymerization of propylene was carried out with the same apparatus and conditions as in Example 1, except that besides the titanium trichloride and ethylaluminum sesquichloride mentioned in Example 1 the various alkali metal salts of inorganic oxyacids, as indicated in Table I, were added in an amount of respectively 5 mmol in carrying out the polymerization reactions.

After completion of the polymerization reactions, an isopropanol-methanol mixture (weight ratio 50:50) was added to decompose the catalyst, then the precipitated solid polymer was separated by filtration, followed by heating with methanol, washing with water and drying in a vacuum dryer at 60° C., whereby were obtained the following solid polymers.

TABLE I

| Example | Metal Salt Added | Solid Polymer (g.) | $\eta_{sp}/C$ [1] | Ether Soluble Fraction of Solid Polymer [2] (Percent) |
|---|---|---|---|---|
| 2 | $Na_2SO_3$ | 7.39 | 2.42 | 46.7 |
| 3 | $Na_2S_2O_4$ | 7.97 | 4.44 | 5.8 |
| 4 | $NaHSO_3$ | 7.92 | 3.53 | 24.1 |
| 5 | $Na_3CO_3$ | 7.56 | 2.45 | 41.2 |
| 6 | $K_2SO_4$ | 28.43 | 2.24 | 9.4 |
| 7 | $Li_2SO_4$ | 8.77 | | 21.2 |
| 8 | $Na_2S_2O_3$ [3] | 36.66 | | 6.9 |
| 9 | $K_2SO_3$ | 13.64 | | 7.8 |
| 10 | $K_2CO_3$ | 9.65 | | 18.0 |
| 11 | $KBO_3$ | 9.85 | | 30.3 |
| 12 | $K_2Cr_2O_7$ | 9.61 | | 15.0 |
| 13 | $KMnO_4$ | 9.64 | | 20.3 |
| 14 | $KNO_3$ | 9.13 | | 12.4 |
| 15 | $NaNO_3$ | 7.86 | | |
| 16 | $NaNO_2$ | 10.13 | | 14.0 |
| 17 | $K_2HPO_4$ | 8.95 | | 19.7 |
| 18 | $K_2CrO_4$ | 9.82 | | |
| 19 | $Na_2CrO_4$ | 8.76 | | |
| 20 | $KVO_3$ | 8.61 | | |
| 21 | $NaClO_3$ | 8.59 | | |

[1] Measured in Tetralin at 135° C., and concentration of 0.2 g./100 cc.
[2] Weight of the eleuted product when the solid polymer was extracted for 24 hours in ether at the boiling point.
[3] 3 mmol used.

EXAMPLE 22

The autoclave described in Example 1 was charged with 60 cc. of purified n-heptane, 2.5 mmol of titanium trichloride (that obtained by reducing titanium tetrachloride with metallic aluminum), 5 mmol of ethylaluminumsesquichloride and 5 mmol of anhydrous sodium sulfate, and the polymerization reaction was carried out as in Example 1 for 4 hours with a propylene pressure of 5 kg./cm.² gauge and a temperature of 80° C.

After completion of the polymerization, purification was carried out by customary procedures to obtain 39.34 g. of solid propylene. The solution viscosity of this product in Tetralin at 135° C. was $\eta_{sp}/C=3.24$ (C=0.2 g./100 cc.) and when extracted for 24 hours with boiling ether, 2.4% of the total solid polymer was eluted. When further extracted for 24 hours with boiling n-heptane, the weight of the polymer eluted was 3.8%.

EXAMPLES 23–29

Experiments were conducted with a 3-component system consisting of titanium trichloride, ethylaluminum sesquichloride and anhydrous sodium sulfate, the proportion of the ethylaluminum sesquichloride to the anhydrous sodium sulfate being varied.

A 200-cc. magnetic stirrer-equipped autoclave was charged with 60 cc. of purified n-heptane, 2.5 mmol of titanium trichloride (as used in Example 22) 5 mmol of ethylaluminum sesquichloride and anhydrous sodium sulfate in the amounts indicated in Table II, the additions being in the order given. Following the general procedures described in Example 1, the polymerization reactions were carried out at 60° C. for the number of hours indicated in Table II while maintaining a propylene pressure of 5 kg./cm.² gauge.

The results obtained after treating the reaction products with alcohol and water followed by drying are shown in Table II.

TABLE II

| Example | Anhydrous sodium sulfate (mmol) | Molar Ratio $Na_2SO_4$ / $(C_2H_5)_2Al_3Cl_3$ | Polymerization Time (hr.) | Yield of Solid Polymer (g.) |
|---|---|---|---|---|
| 23 | 3.0 | 0.6 | 4.5 | 44.50 |
| 24 | 4.0 | 0.8 | 3.0 | 39.02 |
| 25 | 5.0 | 1.0 | 2.0 | 33.01 |
| 26 | 6.0 | 1.2 | 2.0 | 32.57 |
| 27 | 8.0 | 1.6 | 2.0 | 35.60 |
| 28 | 10.0 | 2.0 | 2.0 | 29.61 |
| 29 | 11.0 | 2.2 | 2.0 | 23.06 |

EXAMPLE 30

A 100-cc. magnetic stirrer-equipped autoclave was charged with 40 cc. of purified toluene, 2 mmol of phenylaluminum sesquibromide, 1.5 mmol of titanium trichloride and 1.5 mmol of potassium sulfate. The polymerization reaction was then carried out for 10 hours at a polymerization temperature of 70° C. and a propylene pressure of 3 kg./cm.² gauge to yield 18.2 g. of solid propylene.

The $\eta_{sp}/C$ of this product measured in Tetralin at 135° C. was 5.85.

EXAMPLE 31

A 100-cc. autoclave was charged with 20 cc. of n-heptane, 13.35 g. of 4-methylpentene-1, 1.5 mmol of titanium trichloride, 3.0 mmol of ethylaluminum sesquichloride and 3.0 mmol of sodium sulfate, after which the polymerization reaction was carried out for 5 hours by immersing the autoclave in a constant temperature oil bath held at 65° C.

Isopropanol was added to the resulting product to decompose the catalyst, following which the product was repeatedly washed in methanol and finally, after washing with a water-methanol mixture, was vacuum dried.

The yield of the polymer was 11.52 g. and its solution viscosity in Tetralin at 135° C. was $\eta_{sp}/C=3.45$ (C=0.2 g. 100 cc.). The yield of the polymer corresponds to 86.3% of the weight of monomer.

EXAMPLES 32–33

Instead of the titanium trichloride of Example 22 3 mmol of either vanadium tetrachloride or 3 mmol of zirconium tetrachloride was used and the polymerization temperature used was 70° C. The same procedure as described in said example was otherwise followed, with the consequence that in both cases solid crystalline polypropylene was obtained.

What is claimed is:

1. A catalyst composition for polymerization of alpha-olefins, which is characterized in that said composition contains the three components of an aluminum sesquihalide having the formula $R_3Al_2X_3$, wherein R is a hydrocarbon radical having 1–15 carbon atoms and X is a halogen, a halide of a transition metal of Groups IVa–VIa of the Periodic Table, and an alkali metal salt of an oxyacid selected from the group consisting of nitric acid, nitrous acid, sulfuric acid, sulfurous acid, hydrosulfurous acid, thiosulfuric acid, boric acid, phosphoric acid, phosphorous acid, hypophosphorus acid, silicic acid, chloric acid, arsenic acid, arsenious acid, antimonic acid, chromic acid, manganic acid, selenic acid, selenious acid, carbolic acid, cyanic acid, tungstinic acid, molybdenic acid, metavanadic acid, metastannic acid, aluminic acid and titanic acid in a molar ratio of 1:0.1–4:0.05–5.

2. A catalyst composition for polymerization of alpha-olefins which is characterized in that said composition contains the three components of an aluminum sesquihalide having the formula $R_3Al_2X_3$, wherein R is a hydrocarbon radical having 1–15 carbon atoms and X is a halogen, a halide of a transition metal of Groups IVa–VIa of the Periodic Table, and an alkali metal salt of an oxyacid selected from the group consisting of nitric acid, nitrous acid, sulfuric acid, sulfurous acid, hydrosulfurous acid, thiosulfuric acid, boric acid, phosphoric acid, phosphorous acid, hypophosphorus acid, silicic acid, chloric acid, arsenic acid, arsenious acid, antimonic acid, chromic acid, manganic acid, selenic acid, selenious acid, carbolic acid, cyanic acid, tungstinic acid, molybdenic acid, metavanadic acid, metastannic acid, aluminic acid and titanic acid in a molar ratio of 1:0.1–4:0.2–2.

(References on following page)

References Cited

UNITED STATES PATENTS

| | | | |
|---|---|---|---|
| 2,868,772 | 1/1959 | Ray et al. | 260—94.9 |
| 2,951,066 | 8/1960 | Coover et al. | 252—429 |
| 3,026,312 | 3/1962 | Hagenmeyer et al. | 252—429 |
| 3,060,132 | 10/1962 | Weeks et al. | 252—429 |
| 3,125,558 | 3/1964 | Hagenmeyer et al. | 252—429 |
| 3,216,987 | 11/1965 | Price | 260—94.9 |
| 3,299,024 | 1/1967 | D'Alelio | 260—94.9 |
| 3,317,499 | 5/1967 | Makaguchi et al. | 260—94.9 |
| 3,328,375 | 6/1967 | Price | 260—94.9 |

PATRICK P. GARVIN, *Primary Examiner.*